July 5, 1932.  E. F. GLENN ET AL  1,866,460
TABLE PAD FOR GLASSES
Filed Jan. 26, 1931

INVENTORS
Ethel F. Glenn
Ruth H. Herring
BY Lancaster, Allwine and Rommel
ATTORNEYS.

Patented July 5, 1932

1,866,460

UNITED STATES PATENT OFFICE

ETHEL F. GLENN AND RUTH H. HERRING, OF SAN ANTONIO, TEXAS

TABLE PAD FOR GLASSES

Application filed January 26, 1931. Serial No. 511,356.

The present invention relates to pads or mats for use on tables where beverage glasses are supported and are adapted for use in place of coasters made of glass, metal and other material of heavy, hard, expensive or frangible material.

The principal objects of the invention are, to provide table pads which will effectively absorb the moisture on the bottoms of glasses or which may flow down the sides of the glasses to the bottom margins thereof, which may be rapidly placed about the table or "tossed" to place without sliding a great distance over the table surface before coming to rest, and which may be easily picked up when it is desired to remove them from the table.

Other objects of the invention are, to provide table pads which are inexpensive to manufacture and hence may be discarded if soiled, without being extravagant, and which may be furnished in a wide variety of colors so that selection may be made as to the color or colors to harmonize with the decorative scheme of the table setting.

Other objects and advantages of the invention will appear in the following detailed description, taken in connection with the accompanying drawing, forming a part of this specification, and in which drawing.

Figure 1:
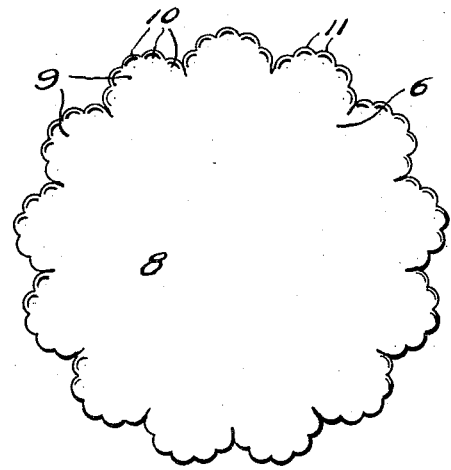
Figure 1 is a bottom plan view of a table pad for glasses made according to the present invention.
Figure 2:
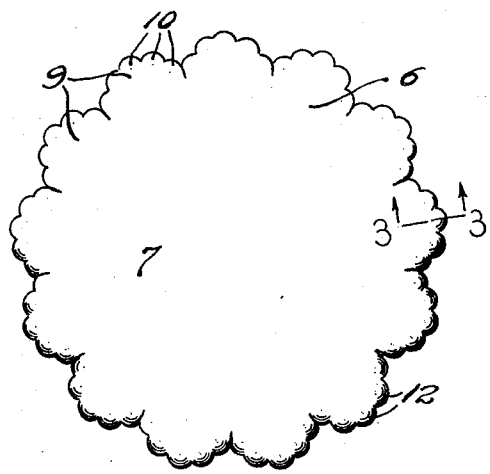
Figure 2 is a top plan view of the same.
Figure 5:
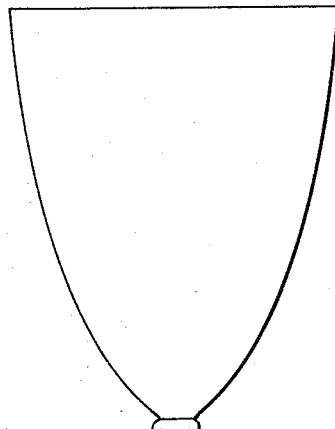
Figure 5 is a view in elevation of a glass resting upon the pad, the latter being shown in cross section.
Figure 3:
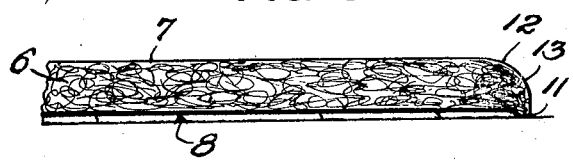
Figure 3 is an enlarged fragmentary sectional view on the line 3—3 of Figure 2.
Figure 4:
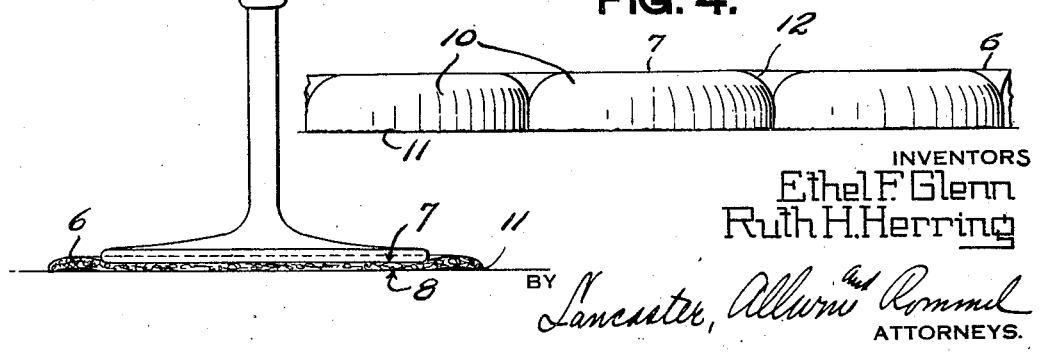
Figure 4 is an enlarged fragmentary view in elevation looking toward a marginal portion of the pad.

In the drawing, where like characters designate like parts or characteristics, 6 designates a flat body providing a top face 7 and a bottom face 8. The body 6 is preferably disc-like, so that it may be tossed to place and so it will conform to the shape of the beverage glass bottom. This body 6 is preferably cut from heavy bibulous, unsized, stiff paper, such as that made from woolen rags or material of open texture having the quality of absorbing fluids and capable of being uniformly colored or mottled to harmonize with selected decorative schemes, but which will not give up the coloring matter when moistened and contacted with another surface.

The marginal portion of the body 6 is preferably scalloped to provide a plurality of major lobes 9, each major lobe having a plurality of minor lobes 10. While this scalloping of the marginal portion of the body 6 adds to its attractiveness, the lobes function to resist sliding movement of the disc over a surface, such as a table top, so that if the pad is tossed it will not, upon coming into contact with the table top, slide for a great distance; it will come to rest shortly after contacting with the table top and is not likely to slide off the table.

By providing the lobes it is possible to more readily pick the pad from the table surface since the finger nail of a person may more readily engage beneath the convex edge thereof than beneath the margin of a plan circular disc.

To further assist in resisting a sliding movement of the pad over a table top, the marginal portion at the bottom 8 is burred as at 11, that is, the fibers of the body 6 are roughly exposed, so as to present a multitude of projections which will engage the table top and cling to minute projections on the latter, such as the threads of a card table fabric top.

It is also preferred to round off the marginal portion of the top 7, from the plane of the top to or adjacent the burred edge 11, as at 12, which not only adds to the appearance of the pad, but compacts the fibrous material as at 13, rendering the marginal portion firm and stiff.

In the reduction of the invention to practice it is found that table pads made according to the present invention have many advantages over glass and metal coasters or coasters of analogous material. They absorb the moisture on the glass bottoms and hence are not likely to adhere to the glass bottoms, but if they do so adhere and drop off after the glasses have been lifted from the table, they do not cause that damage and embarrassment which usually results from a glass or metal coaster dropping from the glass bottom, upon the plate or lap of the user, spilling some of the accumulated liquid, or perhaps breaking china or glassware.

Table pads made according to the present invention may be packed so as to occupy a small space and may be passed around to place in much the same manner as one would deal cards, with the exception that they are not likely to slide off the table as do playing cards when tossed. When they have served their purpose, little if any difficulty is experienced in removing them from the table surface, since the burred edges 11 normally elevate the bottoms of the pads from the table surface when there are no glasses on the pads, and the lobes 9 and 10 aid in obtaining a finger hold on the marginal portions of the pads.

It is to be understood that the term "disc-like" is used more to designate those characteristics of the pad which enable same to be tossed, and is not intended to restrict the invention to pads of circular formation.

We claim:

1. A table pad for glasses comprising a disc-like body of stiff, bibulous, unsized paper having its marginal portion, at the bottom face of the disc, burred and its marginal portion, at its upper face, rounded off and smooth from the plane of said face to adjacent the burred edge.

2. A table pad for glasses comprising a disc-like body of stiff, bibulous, unsized paper having its marginal portion at the bottom of the disc burred so that the disc is normally supported on the burred edge, with its bottom face elevated from the supporting surface.

3. A table pad for glasses comprising a disc-like body of bibulous fibrous material, having fibers at the marginal portion compacted, and at the bottom of the disc, burred.

ETHEL F. GLENN.
RUTH H. HERRING.